US008882453B2

(12) United States Patent
Rousselin

(10) Patent No.: US 8,882,453 B2
(45) Date of Patent: Nov. 11, 2014

(54) ROTOR ELEMENT WITH A FLUID PASSAGE AND PASSAGE-BLOCKING MEMBER AND TURBINE ENGINE INCLUDING THE ROTOR ELEMENT

(75) Inventor: Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 600 days.

(21) Appl. No.: 13/203,758

(22) PCT Filed: Mar. 10, 2010

(86) PCT No.: PCT/EP2010/053055
§ 371 (c)(1),
(2), (4) Date: Aug. 29, 2011

(87) PCT Pub. No.: WO2010/103054
PCT Pub. Date: Sep. 16, 2010

(65) Prior Publication Data
US 2011/0311349 A1 Dec. 22, 2011

(30) Foreign Application Priority Data

Mar. 12, 2009 (FR) ...................................... 09 51557

(51) Int. Cl.
*F01D 11/02* (2006.01)
*F02C 7/28* (2006.01)
*F01D 5/08* (2006.01)
(52) U.S. Cl.
CPC . *F01D 5/082* (2013.01); *F02C 7/28* (2013.01); *Y02T 50/676* (2013.01); *F05D 2300/505* (2013.01)
USPC ...................................... 415/173.7; 415/174.2
(58) Field of Classification Search
USPC ................. 277/433; 415/171.1, 173.7, 174.2, 415/174.5
See application file for complete search history.

(56) References Cited

U.S. PATENT DOCUMENTS

| 3,575,528 | A | * | 4/1971 | Beam et al. ...................... 416/39 |
| 3,712,756 | A | | 1/1973 | Kalikow et al. |
| 6,659,468 | B1 | * | 12/2003 | Phillips .......................... 277/436 |
| 7,059,829 | B2 | * | 6/2006 | Garner ......................... 415/173.7 |
| 2003/0012651 | A1 | | 1/2003 | Arilla et al. |
| 2004/0239039 | A1 | | 12/2004 | Plona |
| 2006/0239812 | A1 | | 10/2006 | Friedel et al. |
| 2007/0154305 | A1 | * | 7/2007 | Arness et al. ............... 415/209.2 |

FOREIGN PATENT DOCUMENTS

| EP | 1 211 381 | 6/2002 |
| EP | 1 306 591 | 5/2003 |
| FR | 2 884 867 | 10/2006 |

OTHER PUBLICATIONS

International Search Report Issued Apr. 19, 2010 in PCT/EP10/053055 filed Mar. 10, 2010.

* cited by examiner

*Primary Examiner* — Edward Look
*Assistant Examiner* — Juan G Flores
(74) *Attorney, Agent, or Firm* — Oblon, Spivak, McClelland, Maier & Neustadt, L.L.P.

(57) ABSTRACT

A rotor element including an annular surface portion about the rotor rotational axis, a fluid passage being formed through the surface portion, a passage-blocking mechanism including a blocking element that is deformable depending on the rotor rotating speed and arranged so as to adjust the fluid flow depending on the rotor rotating speed, and an annular collar with a free edge engaging with the blocking element so as to form the blocking mechanism. The free edge of the annular collar defines, together with the blocking portion of the blocking element, a diaphragm that blocks the fluid passage.

9 Claims, 3 Drawing Sheets

ROTOR ELEMENT WITH A FLUID PASSAGE AND PASSAGE-BLOCKING MEMBER AND TURBINE ENGINE INCLUDING THE ROTOR ELEMENT

BACKGROUND OF THE INVENTION

1. Field of the Invention

The invention relates to the field of turbine engines and its subject is the control of the flow of a fluid through a rotor element depending on the rotation speed of the latter. Its subject more particularly is the cooling of a turbine rotor of a gas turbine engine.

2. Description of the Related Art

A turbojet with front fan and with two spools, for example, comprises a low-pressure spool, called the LP spool, and a high-pressure spool, called the HP spool.

By convention, in the present application, the terms "upstream" and "downstream" are defined relative to the direction of flow of the air in the turbojet. Therefore, a two-spool turbojet with front fan conventionally comprises, from upstream to downstream, a fan, an LP compressor stage, an HP compressor stage, a combustion chamber, an HP turbine stage and an LP turbine stage.

After combustion in the combustion chamber, the gas stream at very high temperature is expanded in the turbines. The elements of the HP turbine subjected to very high temperatures are swept by a cooling fluid.

With reference to FIG. 1, representing the high-pressure spool of a turbojet according to the prior art seen in axial half-section, a cooling circuit is arranged in the engine in which a stream of air, drawn upstream of the combustion chamber 1, is inserted into a cooling volume V arranged between the downstream surface of a sealing disk 3 and the upstream surface of an HP turbine rotor 5.

The sealing disk 3, the function of which is to provide the seal between the rotor and the stator upstream of the turbine, is commonly called the labyrinth disk. It takes the form of an annular part secured to a turbine disk of the HP turbine rotor 5 by its radially inner edge, called the attachment edge 33. The sealing disk 3 is prestressed axially so that its radially outer edge, called the bearing edge 32, presses against the upstream surface of the rim of the HP turbine rotor 5. The sealing disk 3 also comprises a plurality of ventilation holes 31 placed annularly and arranged to allow the insertion of a stream of cooling air between the sealing disk 3 and the HP turbine disk.

An air injector 2 draws an air stream flowing round the combustion chamber 1 and injects it into the cooling volume V via the ventilation holes 31 arranged in the sealing disk 3; the cooling air stream is then distributed in the cooling circuit of the turbine rotor 5 comprising the platforms and the blades 7 mounted on the turbine disk of the turbine rotor 5.

The ventilation holes 31 of the sealing disk 3 are arranged so as to allow an air flow rate that is sufficient to cool the HP turbine disk when the engine is running at full speed, in particular during the take-off phase of the aircraft and when the temperature of the gases is highest.

At cruising speed, the temperature of the gases is not so high and less cooling air is required. Since the flow rate of cooling air supplied by the air injector 2 is not regulated, the HP turbine disk is cooled excessively at cruising speed.

To limit the wastage of cooling air and reduce the specific fuel consumption, a cooling circuit has been proposed that connects the bottom of the combustion chamber 1 to the cooling volume V. It comprises an air flow rate regulating valve the opening of which is controlled depending on the engine speed. Such a valve would make it possible to regulate the flow rate of the cooling air stream in the cooling volume V.

However, such a device has many drawbacks. First of all, in terms of space requirement, it is difficult to arrange sufficient space in the engine to mount the regulating valve. The latter should be installed outside the engine. It would then be necessary to modify the structure of the engine by providing, for example, hollow stator air foils to allow air to be reinserted into the engine and a guidance means under the chamber in the direction of the cooling volume V. Finally, in terms of reliability, a failure of the valve could cause insufficient cooling of the HP turbine and the destruction of the engine.

Document U.S. Pat. No. 3,575,528 A1 describes a system for cooling rotor turbines comprising a bimetallic ring forming a valve arranged to block an air passage.

BRIEF SUMMARY OF THE INVENTION

The object of the invention is therefore to produce a means for controlling the flow rate of cooling air and more generally the flow rate of a fluid in a turbine engine, depending on a rotation speed of the turbine engine.

The invention therefore relates to a turbine-engine rotor element comprising an annular surface portion about the rotation axis of the rotor and a fluid passageway arranged through said surface portion.

The rotor element is characterized in that it comprises a means for closing said passageway, said closing means comprising a closing element that can be deformed depending on the rotation speed of the rotor and being arranged to regulate the fluid flow rate depending on the rotation speed of the rotor.

Placing a fluid control means at the rotor makes best use of the space available in the machine and dispenses with the need to find room for a valve.

Such a system is reliable because it requires no external control system that might fail. Moreover, it can advantageously be adapted to existing turbine engines without requiring considerable structural modifications.

According to one embodiment, the closing element is of annular shape and comprises an attachment portion, a deformable body of tapered shape and a closing portion.

Use is thus made of the difference between the centrifugal forces at the various operating speeds of the turbine engine in order to act directly on the closing element and produce a very compact assembly.

Advantageously, the rotor element comprises an annular shroud with a free edge interacting with said closing element in order to form said closing means, the free edge of the annular shroud forming with the closing portion of the closing element a diaphragm closing the fluid passageway. More particularly, the closing portion is of cylindrical shape and said free edge of the shroud is in the form of a lip, the diaphragm being defined by the aperture arranged between the cylindrical closing portion and the lip.

According to another feature of the invention, the closing element is made of a shape-memory alloy. The use of a shape-memory alloy is particularly advantageous because it usually has a more extended range of elasticity than the other metal alloys. By being used, in this application, over only a fraction of its range of elasticity, it is subjected to less fatigue and its service life is a priori longer than for another metal.

The invention also relates to a turbine engine comprising a rotor element as claimed.

The invention therefore applies to a turbine engine comprising a turbine rotor with a turbine disk and a sealing disk, the sealing disk comprising at least one passageway for the fluid for cooling the turbine disk and forming said rotor element with said closing means for the fluid for cooling the turbine disk.

Notably, advantage is taken of the difference in rotation speed of the order of 10% between cruising speed and full speed in order to regulate the flow rate of cooling air. Thus, the closing means provides a fluid passageway of determined aperture at a first rotation speed of the turbine rotor, called full speed. The closing means also provides a fluid passageway of minimal aperture at a second rotation speed of the turbine rotor, called cruising speed, that is less than the first speed.

The solution of the invention finally allows the closing means to provide a fluid passageway of maximal aperture at zero rotation speed of the turbine rotor.

BRIEF DESCRIPTION OF THE SEVERAL VIEWS OF THE DRAWINGS

The invention will be better understood with the aid of the appended drawing in which:

FIG. 2 represents more particularly the position of the closing element when the rotor speed is zero (engine stopped);

FIG. 3 represents more particularly the position of the closing element when the rotor speed is high (full speed), FIG. 4 represents more particularly the position of the closing element when the rotor speed is reduced (cruising speed) and FIG. 5 represents a curve representing the aperture of the diaphragm depending on the rotation speed of the turbine rotor.

DETAILED DESCRIPTION OF THE INVENTION

Figure 1:
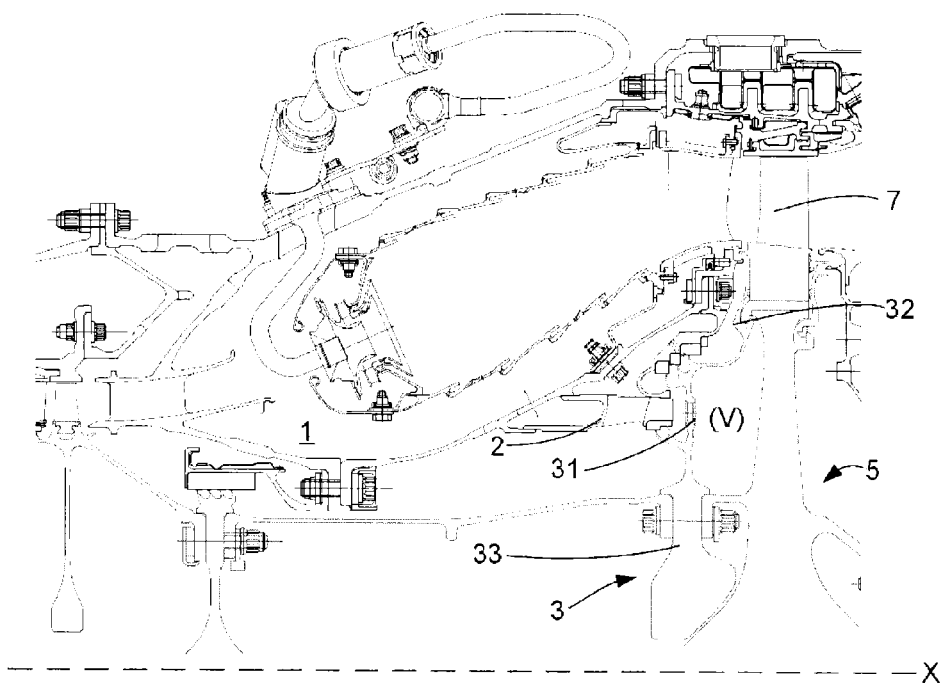
FIG. 1 represents a view in axial half section of the high-pressure spool of a turbine engine according to the prior art.

FIG. 1 shows the representation of the high-pressure HP spool of a turbine engine such as a two-spool turbojet. The latter, as explained above, comprises a low-pressure spool, called the LP spool, and a high-pressure spool, called the HP spool.

Figure 2:
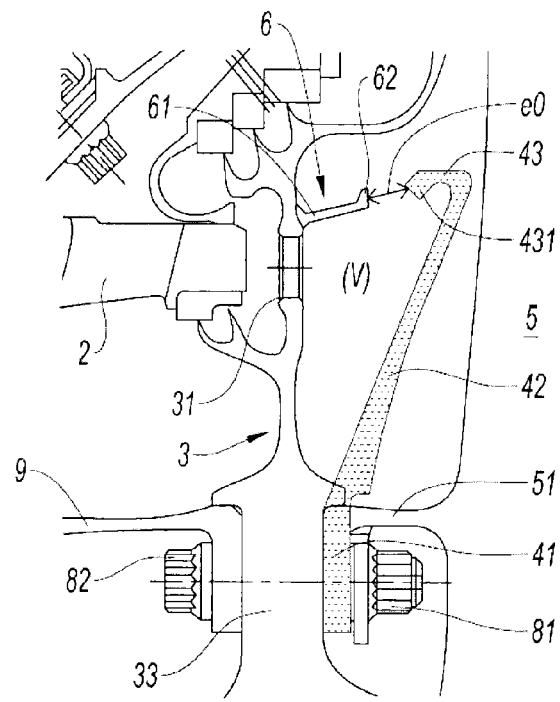
FIGS. 2, 3 and 4 represent a closing element, mounted between a turbine disk and a sealing disk of a turbine rotor of a turbine engine according to the invention.

With reference to FIG. 2, representing the solution of the invention applied to the cooling of the HP turbine rotor of a gas turbine engine, a closing element 4 is mounted between the HP turbine disk of the HP turbine rotor and the rotor element formed by the sealing disk. It is secured to the latter in rotation.

The HP turbine rotor 5 comprises a turbine disk taking the form of an annular part and extending transversely to the axis X of the engine as shown in FIG. 1. The HP turbine disk comprises an axial bore in which a drive shaft, not shown, of the LP spool extends. The radially outer edge of the HP turbine disk comprises turbine blades 7 mounted in housings arranged on the periphery of the HP turbine disk, the blades 7 extending radially outward as shown in FIG. 1.

The HP turbine disk comprises an upstream attachment flange 51 taking the form of a shroud the concavity of which is turned inward, that is to say toward the axis X of the engine. The upstream attachment flange 51 of the HP turbine disk 5 comprises a plurality of longitudinal attachment holes that are uniformly distributed annularly. The upstream attachment flange 51 of the HP turbine disk makes it possible to connect the HP turbine disk to an element 9 of the HP turbine spool in the form of a drum connected to the HP compressor and to the closing element 4.

The sealing disk 3 takes the form of an annular disk, substantially tapered from upstream to downstream, extending transversely to the axis X of the engine and connected to the element 9 of the HP turbine spool of the engine. The sealing disk 3 is mounted upstream of the HP turbine disk and is secured to the latter in rotation.

The sealing disk 3 comprises radial strips 35, commonly called "lips" by those skilled in the art, arranged to correspond with an "abrable" element 36 attached to the engine housing and to form a labyrinth seal between the sealing disk 3 and the engine housing during the rotation of the sealing disk 3 with the HP spool 9, preventing a stream of hot air originating from the combustion chamber from being propagated in the engine.

The sealing disk 3 comprises a radial attachment portion 33, that is radially on the inside, connected upstream of the element 9 of the HP turbine spool and downstream to the HP turbine disk, and a bearing portion 32, radially on the outside, bearing on the upstream surface of the HP turbine disk. The sealing disk 3 is prestressed axially so that its bearing portion 32 exerts a holding force on the HP turbine disk, in particular preventing the blades 7 from moving in the housings arranged on the periphery of the HP turbine disk.

The sealing disk 3 comprises an annular surface portion about the rotation axis of the rotor in which is made a plurality of uniformly distributed longitudinal ventilation holes 31, arranged to allow the injection of a stream of cooling air between the sealing disk 3 and the HP turbine disk. An air injector 2, placed upstream of the ventilation holes 31 of the sealing disk 3, makes it possible to inject cool air flowing round the combustion chamber of the engine. The ventilation holes 31 form a passageway for cooling fluid in the sealing disk 3. The radial attachment portion 33 of the sealing disk 3 comprises a plurality of longitudinal attachment holes, uniformly distributed annularly, arranged to correspond with the attachment holes of the HP turbine disk 5.

According to the invention, with reference to FIG. 2, the turbine engine comprises an element 4 for closing the passageway for injection of the stream of cooling air between the sealing disk 3 and the HP turbine disk.

The closing element 4 takes the form of an annular disk 4, or side panel, mounted transversely to the axis X of the engine, between the sealing disk 3 and the HP turbine disk. The closing element 4 is mounted fixedly to the sealing disk 3 and the HP turbine disk. In the rest position, when the engine is stopped, the closing element 4 is substantially tapered from upstream to downstream. The closing element 4 comprises a radially internal radial attachment portion 41, in which are arranged longitudinal attachment holes that are uniformly distributed annularly, a free closing portion 43, that is radially external, taking the form of a cylindrical surface with an annular rim 431 turned inward and a frustoconical portion 42 connecting its attachment portion 41 to its free closing portion 43 as shown in FIG. 2.

Still with reference to FIG. 2, the closing element 4 is mounted fixedly with the sealing disk 3 and the HP turbine disk. Bolts 82 pass through, successively from upstream to downstream, attachment holes of the drum 9 of the HP spool of the engine, the attachment holes of the sealing disk 3, the attachment holes of the closing element 4 and the attachment holes of the HP turbine disk 5. The bolts 82 interact at their end with nuts 81.

The closing element 4 is in this instance formed of a shape-memory alloy (AMF), known per se. The main shape-memory alloys comprise alloys of nickel and titanium, preferably in equal proportions. A shape-memory alloy (AMF) has the advantage of having an extended range of elastic deformation. By being used over only a portion of its range of elasticity, it is not subjected to fatigue cycles very much. Its service life is therefore longer than another metal of which the extent of the range of elasticity is smaller.

When the turbine engine is rotating, the closing element 4 is subjected to the centrifugal forces and is made to deform in an elastic manner. The frustoconical portion 42 of the closing element 4, substantially tapered in this instance from upstream to downstream when at rest, is deformed under the effect of the centrifugal force so that its free closing portion 43 moves in the upstream direction. The closing portion 43 of the closing element 4 partially closes the passageway for the stream of cooling air in the engine, that is to say the passageway delimited by the ventilation holes 31 formed in the sealing disk 3.

In other words, gradually as the rotation speed of the engine (the speed of the HP turbine rotor 5) increases, under the effect of the centrifugal force, the closing element 4 straightens up in a plane transversal to the axis X of the engine. Therefore, depending on the rotation speed of the engine, the passageway is more or less closed by said closing element 4, thus regulating the flow rate of the stream of cooling air.

With reference to FIG. 2, in a preferred embodiment of the invention, the sealing disk 3 comprises a closing shroud 6, or threshold, arranged on its downstream face, extending substantially longitudinally in the downstream direction. The closing shroud 6 comprises a longitudinal cylindrical body 61 the upstream end of which is connected to the downstream face of the sealing disk 3 and the free downstream end of which is terminated by a radially external annular lip 62 arranged to interact with the closing element 4.

Still with reference to FIG. 2, the annular closing shroud 6 is arranged at a radial distance greater than that of the ventilation holes 31 of the sealing disk 3. Accordingly, when the air injector 2 injects a stream of cooling air between the sealing disk 3 and the HP turbine disk, via the ventilation holes 31, the stream of air flows between the free end of the annular closing shroud 6 and the free closing portion 43 of the closing element 4 before reaching the HP turbine disk and flowing, for example, between the roots of the blades 7 and their housings arranged on the periphery of the HP turbine disk.

The annular shroud 6 interacts with the free closing portion 43 in order to form a means for closing the passageway for the cooling fluid, the free edge 62 of the annular shroud 6 forming with the closing portion of the closing element 4 a diaphragm closing the fluid passageway 31.

The distance between the free end 62 of the closing shroud 6 and the free portion 43 of the closing element 4 is hereinafter called the "diaphragm aperture". The bigger the diaphragm aperture (e), the greater the flow rate of the stream of cooling air. In other words, the diaphragm aperture makes it possible to regulate the flow rate of the stream of cooling air.

The deformation of the closing element 4, depending on the rotation speed of the HP turbine rotor 5, makes it possible to program the aperture of the diaphragm and consequently the flow rate of the stream of cooling air.

With reference to FIG. 2, representing the position of the closing element 4 when the engine is stopped, that is to say in the rest position, the diaphragm aperture e0 is great, thus allowing considerable cooling of the HP turbine disk.

Figure 3:
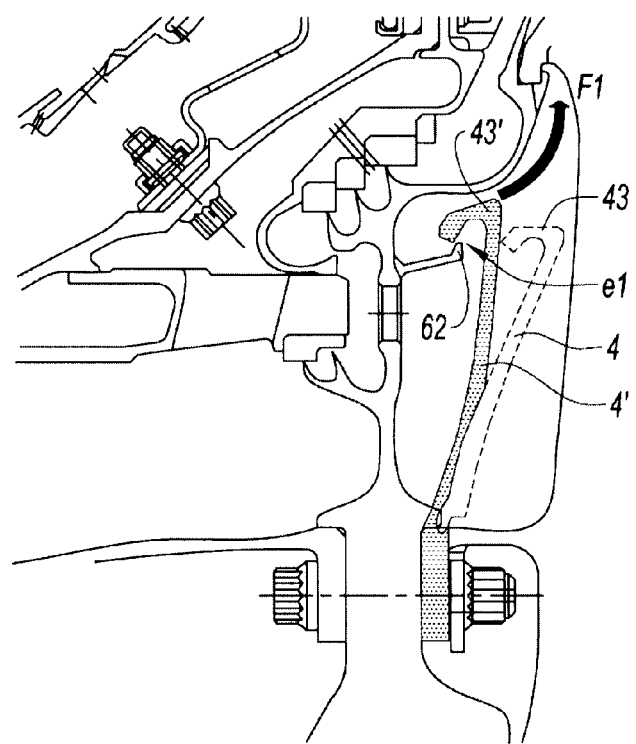

FIG. 3 represents two different positions of the closing element 4. In the interests of clarity, the position of the closing element is referenced 4 in the rest position and 4' when the engine rotates at a high speed (14 000 rpm), for example, at full speed during a take-off phase.

At full speed, the closing element 4' straightens up radially under the effect of the centrifugal force generated by the engine and moves close to the free end of the closing shroud 6. In other words, during take-off, the lip 62 of the closing shroud 6 is placed in the cavity of the cylindrical portion 43' of the closing element 4', the stream of air flowing between the outer surface of the lip 62 and the inner surface of the cylindrical portion of the free end 43'.

The diaphragm aperture e1 between the lip 62 of the closing shroud 6 and the free end 43' of the closing element 4' is smaller than when the engine is at rest, but sufficient to allow the cooling of the HP turbine disk. A stream of cooling air F1, with a considerable flow rate, flows upstream of the closing element 4'.

Advantageously, the closing free portion 43 of the closing element 4 and the lip 62 of the closing shroud are formed so as to arrange a determined diaphragm aperture e2 for a predetermined rotation speed of the HP turbine rotor 5 corresponding to the rotation speed at full speed of the engine during take-off, for example 14 000 rpm. It goes without saying that various shapes of closing shrouds/thresholds 6 or of closing elements 4 would make it possible to fulfill this diaphragm function.

Figure 4:
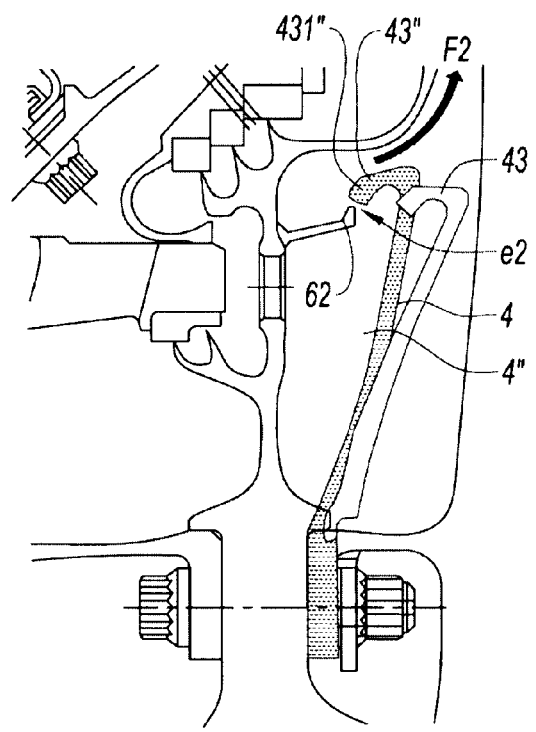

FIG. 4 represents two different positions of the closing element 4. In the interests of clarity, the position of the closing element is referenced 4 in the rest position and 4" when the engine operates at cruising speed (12 800 rpm), that is to say for a rotation speed (Vc) below the rotation speed (Vto) at full speed.

At cruising speed, the closing element 4" moves in the downstream direction relative to its position at full speed, the centrifugal force generated by the engine being weaker than during take-off. The lip 62 of the closing shroud 6 is placed in the alignment of the rim 431" of the closing portion 43" of the closing element 4" as shown in FIG. 4, the passageway for the injection of air then being partially closed or diaphragmed.

At cruising speed (Vc), the closing element 4" is very close to the free end 62 of the closing shroud 6. The diaphragm aperture e2 between the free end 62 of the closing shroud 6 and the free end 43" of the closing element 4" is smaller than during take-off. Therefore, the flow rate of the stream of cooling air F2 that flows upstream of the closing element 4" is lower by comparison with take-off (Vto). In practice, the free portion 43 of the closing element 4 is moved by a distance of 4 mm between its take-off position and its cruising position.

Figure 5:
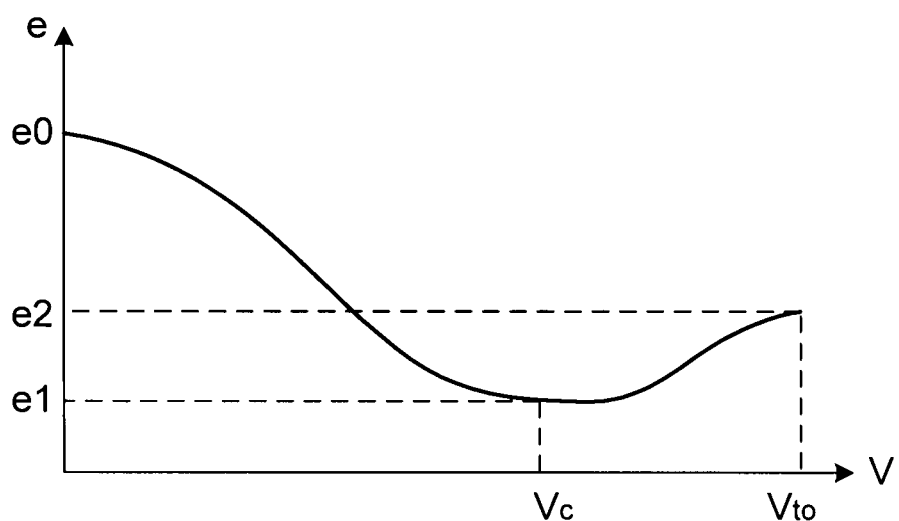

With reference to FIG. 5, the deformation of the closing element 4 makes it possible to modify the diaphragm aperture e depending on the rotation speed of the engine. Advantageously this makes it possible to regulate the flow rate of cooling air depending on the needs of the engine.

Finally, with respect to the reliability of the engine, if the closing element 4 should fail, it will remain in the maximum deformed position (in the take-off position) as shown in FIG. 3, allowing a considerable flow rate of cooling air.

The invention claimed is:
1. A rotor element comprising:
an annular surface portion about a rotation axis of the rotor;
a fluid passageway arranged through the surface portion; and
means for closing the passageway, the means comprising:
a closing element that can be deformed depending on rotation speed of the rotor, arranged to regulate fluid flow rate depending on the rotation speed of the rotor, the closing element being of annular shape, and comprising a radially internal radial attachment portion including a plurality of longitudinal attachment holes distributed annularly and each having an axis substantially parallel to the rotation axis, a deformable frustoconical portion extending from the attachment portion, and a radially external free closing portion extending from the frustoconical portion; and an annular shroud with a free edge interacting with the closing element to form the means for closing, the free edge of the annular shroud forming with the closing portion of the closing element a diaphragm closing the fluid passageway.

2. The rotor element as claimed in claim 1, wherein the closing portion is of cylindrical shape and the free edge of the shroud is in a form of a lip, the diaphragm being defined by an aperture arranged between the cylindrical closing portion and the lip.

3. The rotor element as claimed in claim 2, wherein the closing element is made of a shape-memory alloy.

4. A turbine engine comprising a rotor element as claimed in claim 1.

5. The turbine engine as claimed in claim 4, further comprising:
   a turbine rotor with a turbine disk; and
   a sealing disk,
   the sealing disk comprising at least one passageway for the fluid for cooling the turbine disk and forming the rotor element with the means for closing for the fluid for cooling the turbine disk.

6. The turbine engine as claimed in claim 1, wherein the means for closing provides a fluid passageway of determined aperture at a first rotation speed of the turbine rotor.

7. The turbine engine as claimed in claim 6, wherein the means for closing provides a fluid passageway of minimal aperture at a second rotation speed of the turbine rotor that is less than the first speed.

8. The turbine engine as claimed in claim 7, wherein the means for closing provides a fluid passageway of maximal aperture at zero rotation speed of the turbine rotor.

9. The rotor element as claimed in claim 1, wherein the closing portion includes an annular rim turned inward.

* * * * *